O. W. COOK.
TENT ATTACHMENT FOR AUTOMOBILES.
APPLICATION FILED OCT. 21, 1916.
1,267,979.
Patented May 28, 1918.
2 SHEETS—SHEET 2.
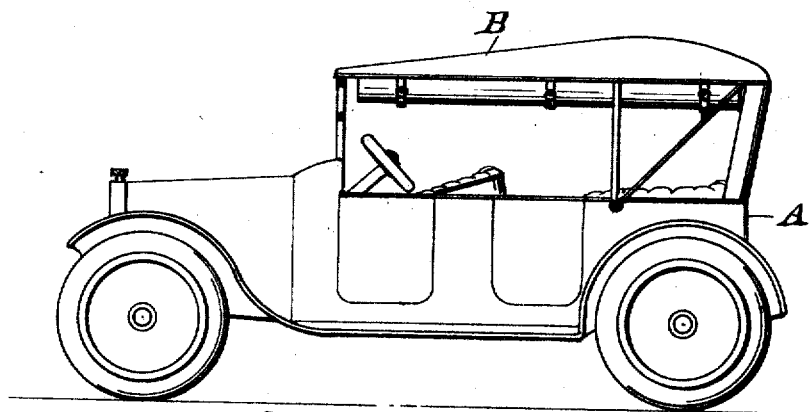
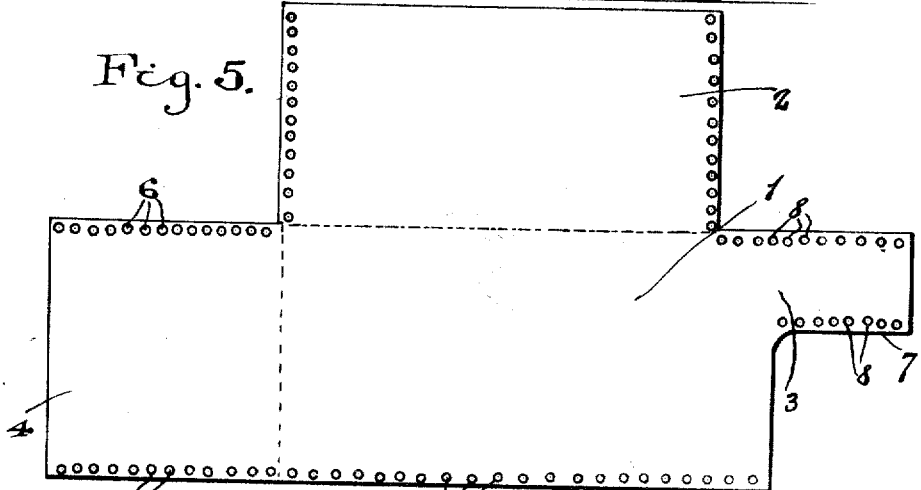
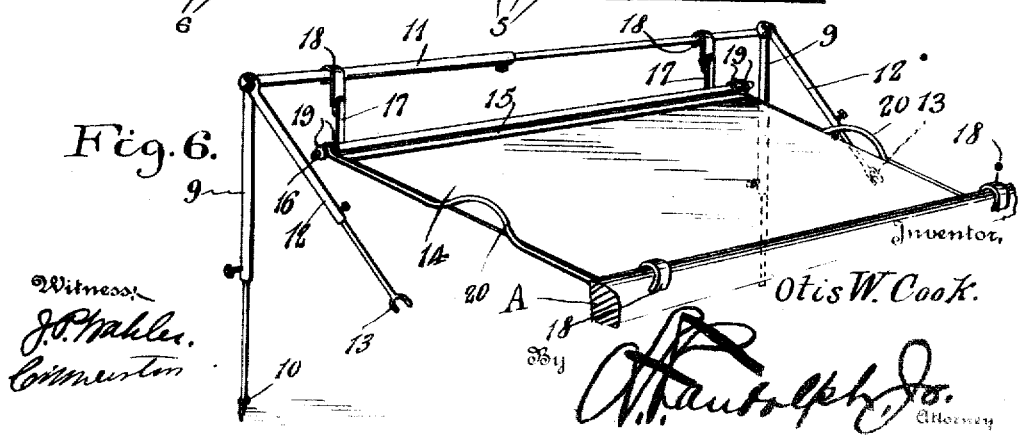

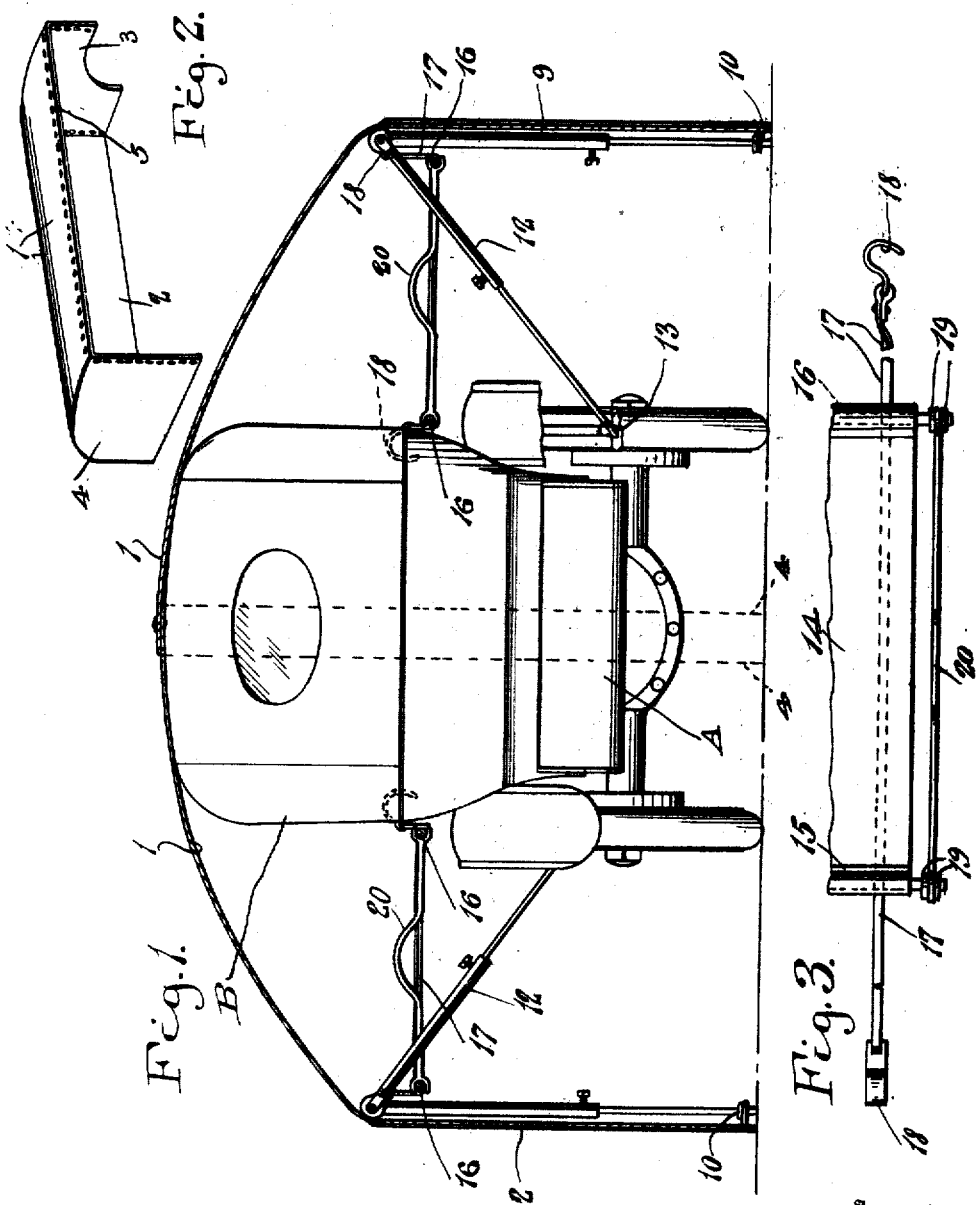

UNITED STATES PATENT OFFICE.

OTIS W. COOK, OF FORT DODGE, IOWA.

TENT ATTACHMENT FOR AUTOMOBILES.

1,267,979.   Specification of Letters Patent.   Patented May 28, 1918.

Application filed October 21, 1916. Serial No. 126,927.

*To all whom it may concern:*

Be it known that I, OTIS W. COOK, a citizen of the United States, residing at Fort Dodge, in the county of Webster and State of Iowa, have invented certain new and useful Improvements in Tent Attachments for Automobiles; and I do hereby declare the following to be a full, clear, and exact description of the invention, such as will enable others skilled in the art to which it appertains to make and use the same.

This invention relates to tents, and has for one object the provision of a tent of novel construction, designed to be associated with an automobile, whereby to admit of the camping out of tourists, when desired, the said tent being adapted when not in use to be folded into a compact mass, so that it can be stored in a minimum amount of space in the automobile.

Another object of the invention is the provision of novel and collapsible foldable cots for the accommodation of the tourists, the said cots being of such construction that they can be suspended above the ground by the body of the automobile, and the supporting structure for the tent, when in operative position, and being designed, when in inoperative position, to be folded with the body of the tent so as to be conveniently stored.

Other objects will appear and be better understood from that embodiment of the invention of which the following is a specification, reference being had to the accompanying drawings forming a part thereof, in which:

Figure 1 is a rear view of an automobile with the tent in operative position, the tent being shown in section.

Fig. 2 is a perspective view of one of the tent sections in unfolded position and detached from the automobile, Fig. 3 is a detail plan view of one end of one of the cots, Fig. 4 is a side view of an automobile, showing the tent in folded position, and for conventional purposes showing the tent carried by the under side of the top of the automobile, Fig. 5 is a plan view of the blank of which one of the tent sections is composed, Fig. 6 is a perspective view of one of the cots, showing the manner of supporting the same in operative position.

Referring to the drawings in detail, the letter A designates an automobile having a top B of usual construction. The tent is shown as consisting of opposed sections, one of which is right and the other left hand in construction, and both of which consist of a top flap 1, side flap 2, front flap 3 and rear flap 4. The sections are adapted, when in operative position, to lie respectively on the opposite sides of the body and the top flaps 1 of the companion sections are adapted to overlie the roof of the automobile top, as shown in Fig. 1. The top flaps 1 of the sections are of sufficient length to admit of the side flaps 2 being spaced considerable distances from the adjacent sides of the automobile body, when the tent is in operative position. The meeting edges of the top flaps are provided with eyelets 5 for receiving lacings, or other fastening elements, for securing the top flaps 1 together when the sections are in operative position. The rear flap 4 of each tent section is adapted to lie in rear of the automobile body when the sections are in operative position, and each of the rear flaps 4 are provided with rows of eyelets 6, adjacent their opposite longitudinal edges, so as to admit of the rear flaps 4 on the tent sections being connected by lacings, or other fastening elements, when the sections are in the position shown in Fig. 1, and also to admit of the side flaps 2 of the tent sections being connected to the adjacent rear flaps 4 by lacings, or other suitable fasteners. The front flaps 3 of the tent sections are adapted to be located in front of the windshield of the vehicle body, and the front flaps 3 on the sections have their meeting edges cutaway, as shown at 7 in Fig. 5 of the drawings, so as to admit of the front flap fitting over the hood portion of the automobile body. The flaps 3 have those edges adjacent the flaps 2 provided with eyelets 8 which admit of the flaps 3 having connection with the side flaps 2 by means of lacings, or other suitable fasteners, which extend through the eyelets 8 and similar eyelets carried by the adjacent edges of the side flaps 2.

The outer portions of the tent sections are supported in operative position by means of supporting frames, each of which includes a pair of corner posts 9 formed of telescoping sections, the lower sections of the corner posts 9 being extended through loops 10 carried by the adjacent side flaps 2 of the tent sections, adjacent the lower edges of the side flaps. The corner posts 9 of each frame are connected by means of a connecting rod 11, formed of adjustable telescoping sections, and the supporting frames are braced in position by means of inclined brace rods 12, which are also formed of adjustable telescoping sections and have their upper ends operatively connected with the adjacent connecting rod 11 and their lower ends bifurcated, as shown at 13, and adapted to engage over the hub portions of the adjacent wheels of the body of the automobile, as shown more particularly in Fig. 1 of the drawings.

A pair of cots are to be suspended within the tent and on opposite sides of the autobile body and each consists of a body portion formed of a rectangular piece of canvas, designated 14, the opposite longitudinal edges of the body 14 being bent and folded over on the body 14, as shown at 15, and fixed so as to provide pockets for the reception of rods 16. Supporting straps 17 pass beneath the body 14 of the cot, adjacent the opposite ends of each of the cots, and have their opposite ends extending beyond the adjacent longitudinal edges of the bodies 14, and terminally provided with hooks 18. The hooks 18 on the opposite terminals of the supporting straps for each cot are adapted to engage, respectively, over the connecting rods 11 of the supporting frames and over the upper edge of the adjacent sides of the body of the automobile, as shown more particularly in Fig. 6 of the drawings. The rods 16, which extend through the pockets 15 at the opposite longitudinal edges of the bodies 14 of the cots, have their opposite ends projecting beyond the adjacent ends of the cot and each is provided with a pair of spaced circular members 19. When the cots are in operative position, rods 20 extend across the opposite ends of the cots, and the said rods have their opposite ends bifurcated and engaging the extended ends of the rods 16, at points between the circular members 19, as shown in Fig. 3 of the drawings. The rods 20 serve to reinforce the cots and prevent the cots from collapsing when being occupied.

When it is desired to fold the tents the cots are detached and the rods 20 removed, so as to admit of the cots being folded longitudinally. The tent supporting frames are then detached and collapsed, and the tent sections disconnected from each other and the adjacent connected flaps of each section released, so as to admit of the sections being folded into the mass, as shown in Fig. 4, and mounted beneath the roof of the automobile top.

It is evident that various changes might be resorted to in the construction, form and arrangement of the several parts without departing from the spirit and scope of the invention as claimed.

Having thus described the invention, what is claimed is:

1. The combination with a vehicle, of a tent therefor, means adapted to support the sides of the tent in spaced relations to the sides of the vehicle, and a cot adapted to be supported at one side of the vehicle and at its outer side by said means.

2. The combination with a vehicle body, of a tent structure detachably associated with the body, supporting frames for the tent structure, cots located on opposite sides of the vehicle body, supporting straps extending below the cot and having hooks thereon for connection with the body and the adjacent supporting frame.

3. The combination with a vehicle body, of a tent structure detachably associated with the body, supporting frames for the tent structure, cots located on opposite sides of the vehicle body and each consisting of a flexible body, rods located at the opposite sides of the body of each cot, supporting straps extending below the cot and having hooks thereon for connection with the body and the adjacent supporting frame, and detachable rods located at the opposite ends of the cots and having connection with the rods at the side edges of the cots, for the purpose specified.

In testimony whereof I affix my signature in presence of two witnesses.

OTIS W. COOK.

Witnesses:
JOHN LAUFERSWEILER,
MARTHA REIN.